United States Patent [19]

Dawson et al.

[11] 4,223,611
[45] Sep. 23, 1980

[54] VEHICLE STEERING APPARATUS

[75] Inventors: John T. Dawson; Duane A. Whitcomb, both of Seattle, Wash.

[73] Assignee: The Boeing Company, Seattle, Wash.

[21] Appl. No.: 28,959

[22] Filed: Apr. 11, 1979

[51] Int. Cl.³ .................. B61F 9/00; B61B 13/04; B62D 1/26
[52] U.S. Cl. ................. 104/247; 74/100 R; 104/119; 105/144; 180/79; 180/140; 280/776
[58] Field of Search ............. 104/118, 119, 130, 242, 104/244.1, 245, 247; 180/79, 131, 140; 280/776, 89; 105/141, 144, 170, 168; 74/97, 100 R

[56] References Cited

U.S. PATENT DOCUMENTS

| 843,420 | 2/1907 | Strickler | 104/247 X |
|---|---|---|---|
| 2,090,409 | 8/1937 | Vaszin | 104/247 |
| 3,098,454 | 7/1963 | Maestrelli | 104/247 |
| 3,254,608 | 6/1966 | Alden | 104/149 |
| 3,338,182 | 8/1967 | Maestrelli | 104/247 |
| 3,363,584 | 1/1968 | Brush et al. | 104/247 |
| 3,393,762 | 7/1968 | Matson | 180/79 |
| 3,502,040 | 3/1970 | Reilly | 104/247 |
| 3,643,601 | 2/1972 | Taylor et al. | 104/119 X |
| 3,724,584 | 4/1973 | Varichon | 180/79 |
| 3,796,165 | 3/1974 | Goode | 104/247 |
| 3,812,789 | 5/1974 | Nelson | 104/130 |
| 3,853,069 | 12/1974 | Goodwin | 180/79 |
| 3,858,523 | 1/1975 | Allsup, Jr. | 104/247 |
| 3,872,793 | 3/1975 | Patin | 104/130 |
| 3,945,455 | 3/1976 | Hamada et al. | 180/79 |
| 3,977,487 | 8/1976 | Katayose et al. | 180/79 |

FOREIGN PATENT DOCUMENTS 2721071 11/1978 Fed. Rep. of Germany ........... 104/247

Primary Examiner—Randolph A. Reese
Attorney, Agent, or Firm—Robert L. Gullette

[57] ABSTRACT

A spring biased over-center linkage transmits a biasing force to opposite guide wheels in alternate sequence for maintaining a selected one of the guide wheels in contact with one of two parallel guide surfaces, depending upon whether the vehicle is operative in a left or a right follower mode. A steering assembly controls the direction of travel of the vehicle in response to the position of the selected one guide wheel as it follows the contour of the cooperative guide surface. A double-acting reciprocative operator positions the over-center linkage at left and right bias positions for left and right follower mode operation, respectively. A spring provides over-center bias to the over-center linkage and constitutes the sole source of biasing force. The apparatus is suitable for use with a vehicle in an automated transportation system in which the vehicle travels along a predetermined travel path or a guideway.

13 Claims, 11 Drawing Figures

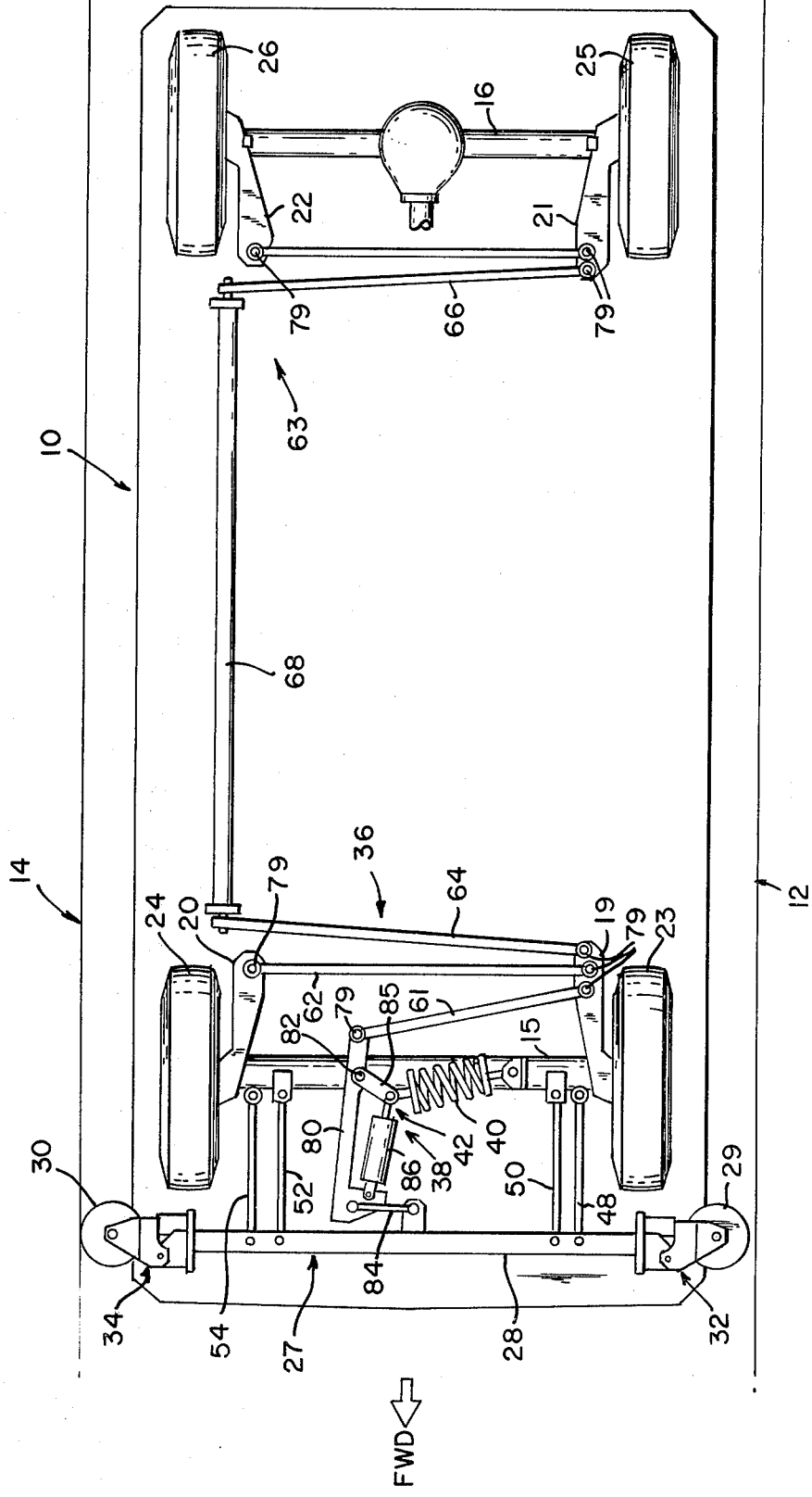

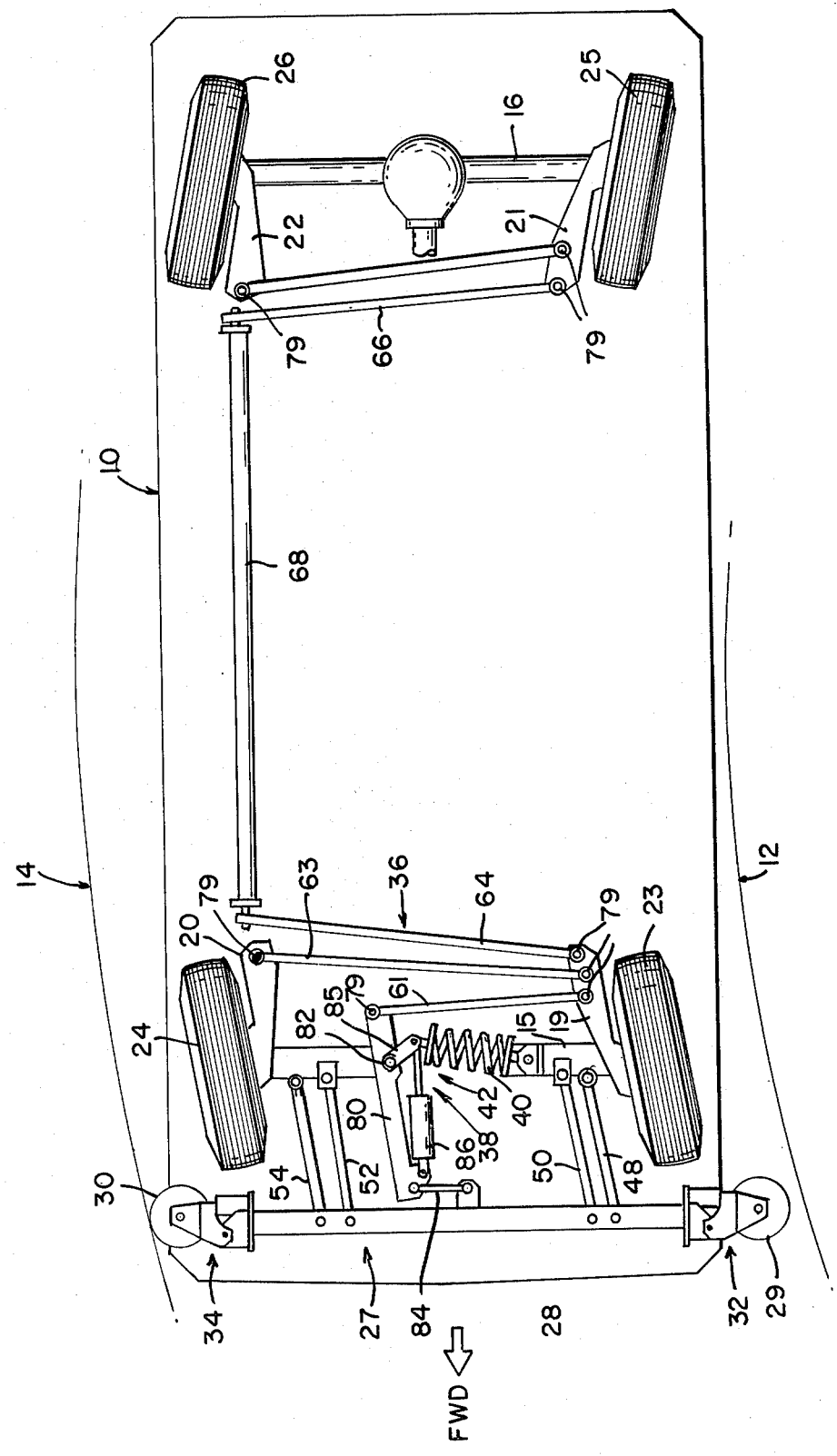

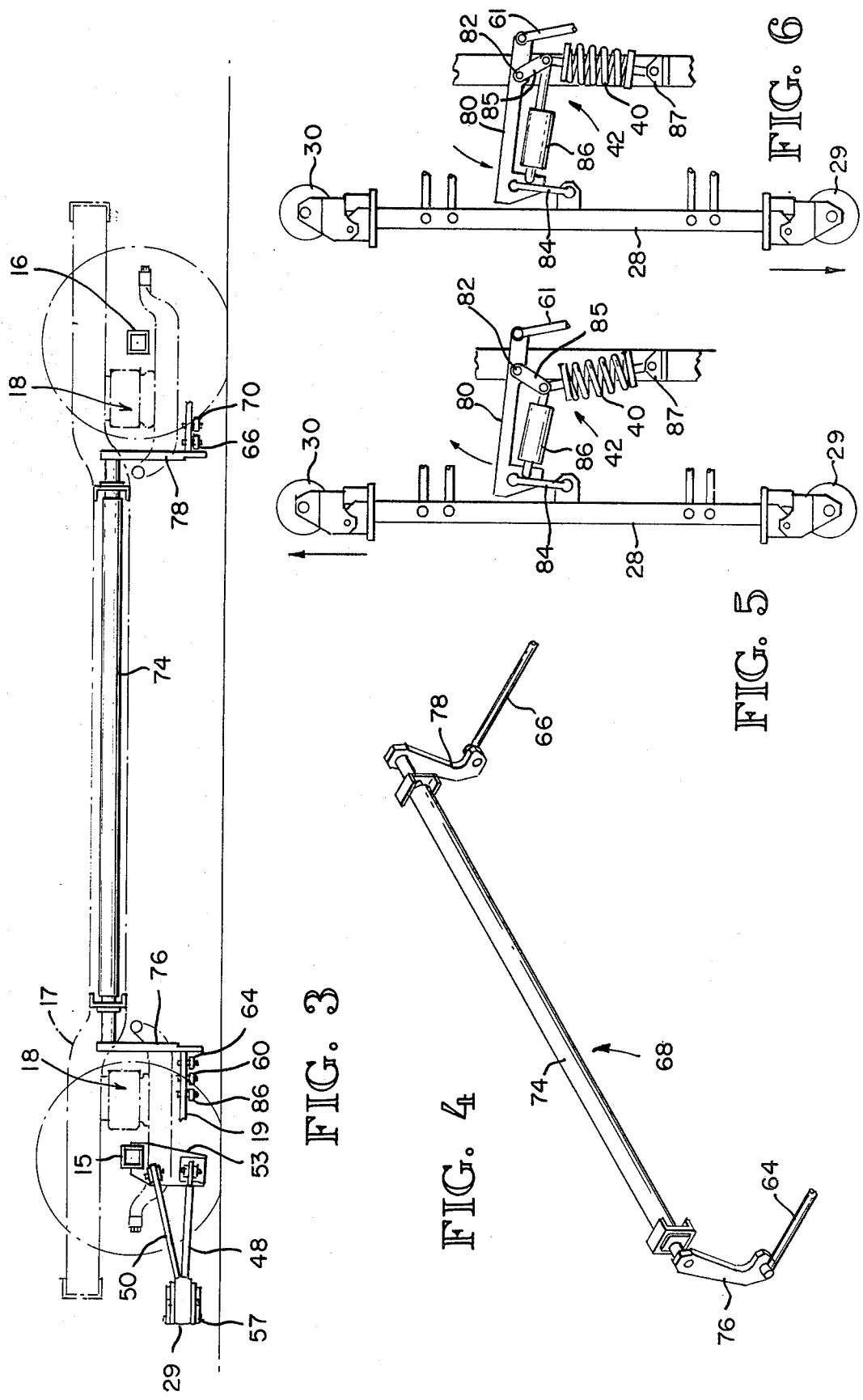

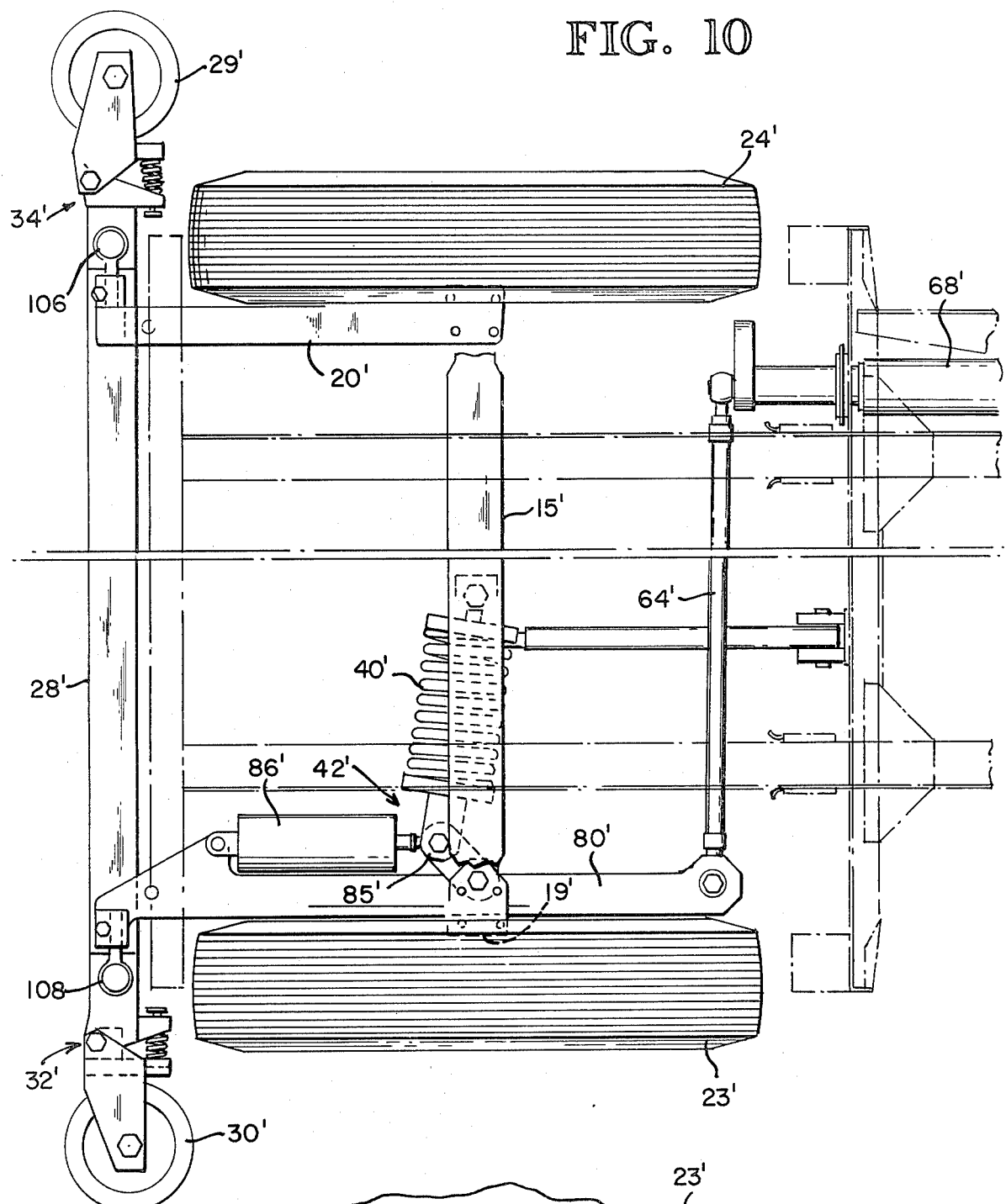

VEHICLE STEERING APPARATUS

BACKGROUND OF THE INVENTION

This invention relates to vehicle steering apparatus and, more particularly, to vehicle steering apparatus for steering a vehicle along a predetermined travel path.

The vehicles with which this invention may be used typically are employed in an automated transportation system in which individual vehicles travel along a guideway between predetermined destinations under external, generally computer control. Vehicle steering and, when appropriate, switching of the vehicle at intersections between multiple predetermined travel paths, is accomplished by steering apparatus which is responsive, in alternate sequence, to the contours of two parallel guide surfaces which are formed by the guideway and between which the vehicle travels. (These guide surfaces are referred to herein as the "left guide surface" and the "right guide surface"). The contours of left and right guide surfaces are respectively followed by left and right guide wheels which are mounted on the vehicle adjacent to the sides thereof. A sterring control mechanism is responsive to the positions of the guide wheels with respect to the vehicle and operates the steering mechanism to effect vehicle steering by moving one or more steerable wheels of the vehicle in unison. The steering control mechanism additionally applies an appropriate bias to the left and right guide wheels in alternate sequence, causing either the left or right guide wheel, as the case may be, to contact and maintain contact with the left guide surface or the right guide surface, respectively, as the vehicle moves along the guideway to obtain desired directional guidance of the vehicle. An exemplary transportation system and vehicle of this type is disclosed in U.S. Pat. No. 3,643,601. As used herein the terms "left follower mode" and "right follower mode" refer to operation of the steering apparatus wherein the left guide wheel and the right guide wheel are in contact with and follow the contour of the left and right guide surfaces, respectively.

Until this invention, steering apparatus for vehicles of the type described customarily utilized hydraulic actuation and control of the guide wheels and vehicle steerable wheels to obtain directional guidance with respect to the guideway. Non-hydraulically operated steering controls and especially spring operated steering controls were considered unsatisfactory because of fears that they required unacceptably large magnitude control or operational forces in order to overcome frictional energy losses, or lacked sufficient accuracy, reliability or sensitivity for automatic control purposes. One such steering apparatus includes a spring-biased, over-center linkage and a bi-directional reciprocative actuator which selectively positions the over-center linkage to apply a left bias force or a right biasing force to the left or right guide wheels, as the case may be. The biasing forces are provided by two sources—a movable spring and a bi-directional hydraulic power steering cylinder. The spring exerts an over-center bias on the cover-center linkage which positions the spring responsive to operation of the positioning actuator so that it will apply bi-directional rotational effort to a rotatable control arm connected between the guide wheels and the steerable wheel(s). The rotational effect obtained appears as biasing forces at the guide wheels. As a consequence, the over-center bias exerted by the spring is transmittable to the guide wheels in alternate sequence as a left bias force and a right bias force, depending upon the over-center position of the spring.

The resultant bias force obtained at each guide wheel, however, is controlled in relation to desired side load by counteractive operation of the second source of spring force—the power steering cylinder—with respect to the spring in accordance with customary practice. The power steering cylinder continuously counters the overcenter spring in phase with the side load applied by the biased guide wheel to the cooperative guide surface to control the side load applied. A control valve acting between the control arm and the guide wheels and responsive to movement of the guide wheels controls hydraulic fluid pressure applied to the power steering cylinder in phase with the side load applied. In an exemplary application, the power steering cylinder continuously counteracts at least 50% of the force generated by the overcenter spring. In the event the powr steering cylinder or control valve become inoperative, however, the side load applied exceeds acceptable limits, with attendant increase in tire wear and decline in steering effectiveness. In some practical cases, moreover, hysteresis and lead-lag factors associated with the control valve may tend to cause the power steering cylinder to become out-of-phase with the side load applied under many operational conditions, especially in the presence of sine sweeps or during translation of the vehicle from a left to a right follower mode. In some instances, shock loads or even relatively minor impacts to the follower wheels cause the control valve to throw the power steering cylinder so far out-of-phase that violent oscillations occur. Other simplified hydraulic control systems suitable for economic mass production and reliable low maintenance operation are likewise unsatisfactory for providing necessary hysteresis and phasing to overcome these deficiencies. More complex hydraulic or combination electro-hydraulic control systems, of course, could be used, although these systems increase the complexity and cost of the steering apparatus to the point that it is uneconomical and lacks desired reliability.

SUMMARY OF THE INVENTION

This invention provides steering apparatus which includes a single source of biasing force for generating a biasing force that is continuously transmitted to opposed guide wheels of the type described in alternate sequence. According to one preferred embodiment of the invention, a steering control assembly operates a steering mechanism in response to the position of one selected guide wheel as it follows the contour of its cooperative guide surface, depending upon whether the steering apparatus is operative in a left or right follower mode. The steering control assembly includes a bi-directional biasing mechanism made up of a single-biased over-center linkage and a double acting reciprocative operator for alternately positioning this linkage at a left bias position and a right bias position in which an appropriate biasing force is transmitted to the left and right guide wheels in alternate sequence via a pivotal control arm, a connecting link and a transverse guide axle which mounts the guide wheels.

The biasing force is generated solely by a spring which provides over-center bias to the over-center linkage. The over-center linkage alternately positions this spring with respect to an intermediate pivot on the control arm when disposed at its left and right bias positions so as to cause this spring to exert bi-directional rotational effort on the control arm. The rotational effort obtained appears at the guide wheels in alternate sequence as biasing forces for left and right follower mode operation. Thus, it is possible, by selecting an over-center spring with force generating capacity related to desired side loads to rely solely on the over-center spring as the source of biasing force. It will be recognized, of course, that the type, size, number and arrangement of over-center spring(s) used may vary, depending upon the type of vehicle, specific applications and other factors.

Contrary to customary steering design practices, therefore, the steering apparatus of this invention relies upon a simple spring construction as a source of biasing forces which, for the first time, successfully overcomes the aforementioned fears associated with non-hydraulic steering controls. With this construction, no forces in counter-active relation to the source of biasing force are required. As a consequence, the hydraulic power steering cylinder and associated hydraulic or electro-hydraulic controls heretofore required, including the aforementioned control valve, may be eliminated. The steering apparatus of this invention therefore exhibits unparalleled reliability and economies.

These and other features, objects, and advantages of the present invention will become apparent from the detailed description and claims to follow, taken into conjunction with the accompanying drawings in which like parts bear like reference numerals.

BRIEF DESCRIPTION OF THE DRAWINGS

FIG. 1 is a top plan view of the steering apparatus according to this invention, depicting the apparatus in a right follower mode during travel along a straight guideway section;

FIG. 2 is generally similar to FIG. 1, depicting the apparatus during travel along a leftwardly curved guideway section:

FIG. 3 is a side elevational view of the FIG. 1 apparatus;

FIG. 4 is a fragmentary perspective view of a rear wheel follower steering assembly of the FIG. 1 apparatus;

FIG. 5 is a schematic depicting operation of the FIG. 1 apparatus in a right follower mode;

FIG. 6 is a schematic generally similar to FIG. 5, depicting operation of the FIG. 1 apparatus in a left follower mode;

FIG. 10 is a top plan view of a second preferred embodiment of the steering apparatus according to this invention;

FIG. 11 is a side elevational view of the FIG. 10 apparatus.

DETAILED DESCRIPTION OF THE DRAWING

Figure 7:
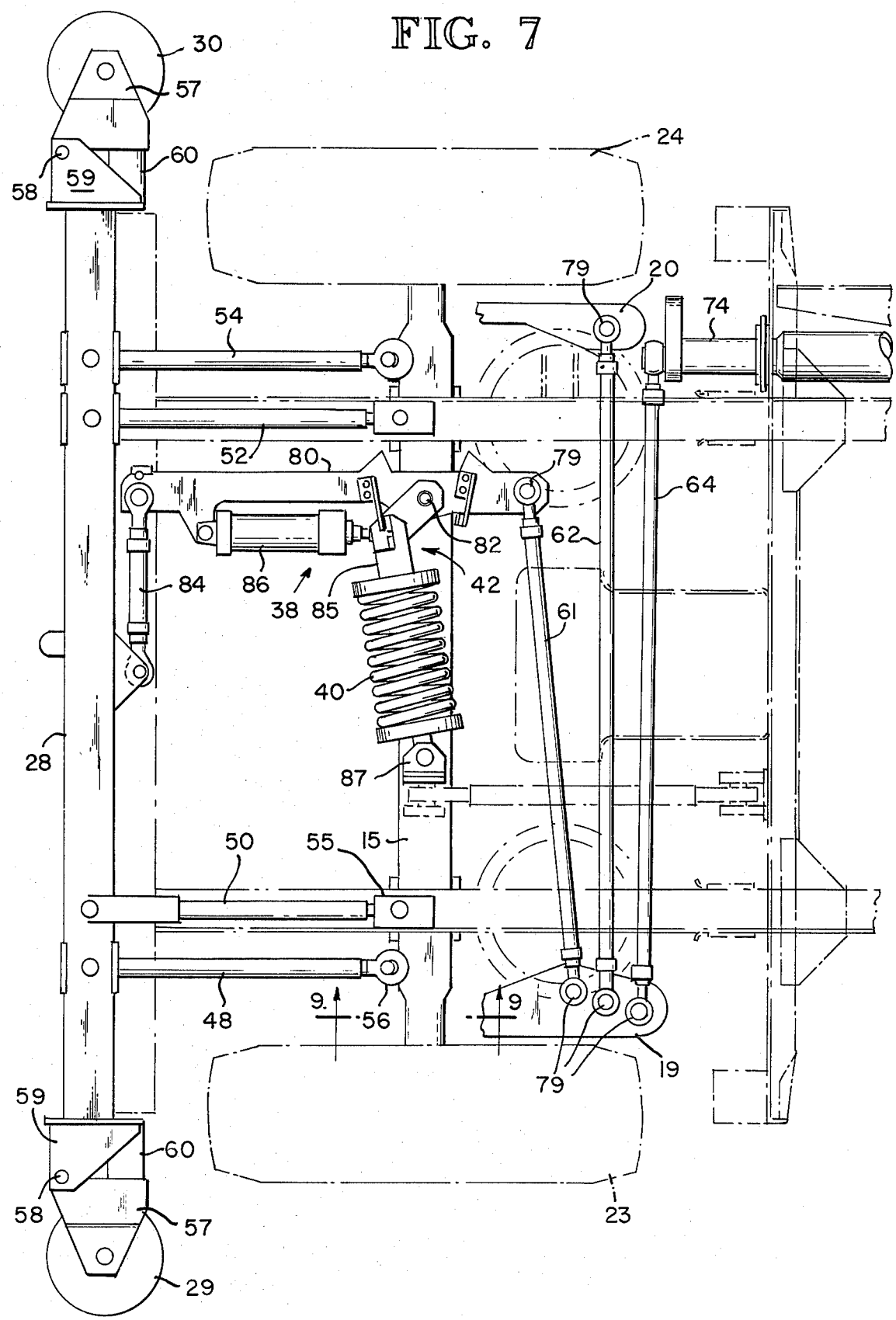
FIG. 7 is a top plan view of the FIG. 1 apparatus on enlarged scale.

Referring to FIGS. 1–3 of the drawings, the steering apparatus according to this invention is suitable for use with a vehicle (generally referenced by numeral 10) adapted to travel along a guideway between parallel left and right vertical guide surfaces 12 and 14 which provide directional guidance to the vehicle. The vehicle illustrated in the example includes front and rear axles 15 and 16 supported from a frame 17 by respective suspensions generally referenced 18. Four independently movable steering arms 19, 20, 21, 22, are mounted pivotally from the end of axles 15 and 16 and support rubber tired wheels 23, 24, 25, 26, respectively. In the example, the wheels are steerable in unison, although the steering apparatus according to this invention could be used with vehicles including one, two or other numbers of steerable wheels.

The illustrated steering apparatus includes a guide follower assembly (generally referenced by numeral 27) which is made up of a transverse guide axle 28 and two rotatable guide wheels, a left guide wheel 29 and a right guide wheel 30, which are supported from the ends of the guide axle by respective resilient force damping mounts 32, 34 for rotational movement about parallel vertical axes. The guide wheels 29 and 30 are aligned with the two guide surfaces 12 and 14, respectively, for rolling follower contact therewith. A steering assembly (generally referenced by numeral 36) is operatively connected to the guide follower assembly for maintaining a selected one of the guide wheels in rolling contact with the cooperative guide surface to obtain directional guidance with respect thereto and for moving the steering arms 19–22 in unison, thereby turning wheels 23–26 so as to control the direction of movement of the vehicle as it moves along the guideway, in response to the position of the selected one guide wheel as it follows the contour of the cooperative guide surface. In the example of FIGS. 1 and 2, wheel 30 is the selected wheel and cooperates with surface 14 for right follower mode operation.

The steering assembly includes a bi-directional biasing mechanism 38 for applying opposite biasing forces to the guide wheels toward their respectively cooperative guide surfaces. The biasing mechanism 38 includes, in the example, a coil compression spring 40 and a bias force control mechanism 42 which is operatively associated with spring 40 for transmitting essentially the full force generated by spring 40 to the guide wheels in alternate sequence. The spring force generated by spring 40 is modulated by damping effects of mounts 32, 34 and frictional forces associated with the steering assembly. In the example illustrated, spring 40 is selected to exert a predetermined biasing force which results in a side load between the guide rollers and the guide surfaces of approximately 230 pounds. In other applications, of course, the spring is selected to result in an appropriate side load which is compatible with the structure and configuration of the guideway and which yields acceptable tire wear.

Figure 9:
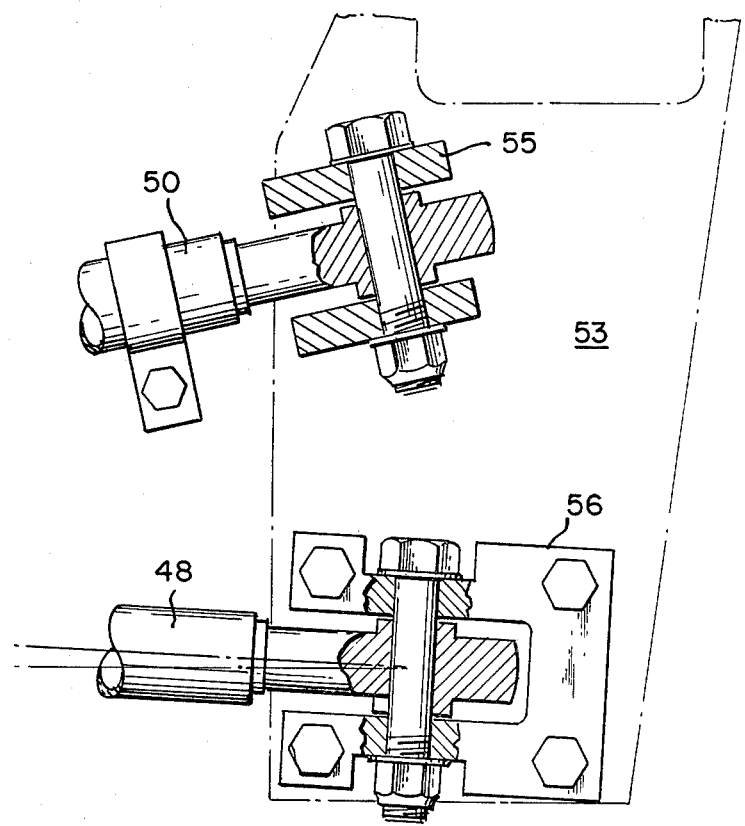
FIG. 9 is a side elevational view taken along line 9—9 in FIG. 7.

Referring to FIGS. 1–3, 7 and 9 the guide axle 28 is supported in transverse alignment with respect to the longitudinal axis of the vehicle adjacent the front end thereof by left and right pairs of upper and lower support rods 48, 50, 52 and 54 which extend forwardly from side plates 53 (FIG. 3) depending from the ends of axle 15. The rear ends of these rods are mounted on the side plates by upper and lower trunnions 55 and 56, respectively, as shown (FIG. 9). The front ends of these rods are pivotally attached to axle 28. As will be appreciated by comparing FIGS. 1 and 2, rods 48, 50, 52 and 54 form a parallelogram linkage for supporting axle 28 while allowing it to shift transversely so as to maintain the selected guide wheel in contact with the cooperative guide surface during travel of the vehicle along a curved path, or during lateral translation of the vehicle within the guideway to convert the apparatus from one follower mode to another adjacent an intersection, for example.

Mounts 32 and 34 each includes a movable wheel support 57 which is pivotally connected at 58 to a fixed wheel support 59 secured to the associated end of axle 28. An elastomeric or coil compression spring 60 is compressed between supports 57 and 59 and is compressed by rotative movement of support 57 toward support 59 with respect to pivot 58. Spring 60 therefore damps minor oscillations of the guide wheels which are generated, for example, by irregularities in the contours of or misalignment in the guide surfaces 12, 14.

The steering arms 19-22 are turnable about respective parallel vertical axes for steering purposes as illustrated in FIG. 2. In the example, only the left front wheel 23 is positively steered responsive to steering forces applied via tie rod 61 to the rear end of the left front steering arm 19, as will be described presently. The right front wheel 24 is steered as a follower wheel by tie rod 62 which connects the rear end of the steering arm 19 with the rear end of steering arm 20. In the example illustrated, the rear wheels 25 and 26 are likewise steerable by a follower steering assembly 63. As illustrated in FIGS. 1 and 2, assembly 63 is made up of a forward tie rod 64, a rear tie rod 66, and a follower steering assembly 68 for transmitting steering forces from tie rod 64 to tie rod 66. A tie rod 70 connects arm 21 with arm 22 so that wheel 26 is steered as a follower with respect to wheel 25. Referring to FIG. 4, the follower steering assembly 68 is composed of a torque tube 74 which is connected at both ends to downwardly extending arms 76 and 78, as shown (FIG. 4). These arms are connected, respectively, to the ends of tie rods 64, and 66. A steering force exerted by tie rod 64 swings arm 76 to exert rotational effort on torque tube 74 which, in turn, swings arm 78. The steering force then is applied to tie rod 66. Low friction bearings are provided at 79 throughout the steering apparatus to minimize frictional losses, thereby permitting the use of a weaker biasing spring.

Referring now to FIGS. 5 and 6, the bias force control mechanism 42 is made up of steering arm 80 which is pivotally supported intermediate its ends by low friction bearings 82 mounted by the forward axle 15. Arm 80 is swingable in a generally horizontal plane. The forward end of arm 80 is secured directly to the guide axle 28 by a rigid connecting link 84 (see also FIG. 7) at a location approximately midway along the length of axle 28. The rear end of arm 80 is connected to tie rod 61. To provide steering control, arm 19 is positioned by tie rod 61 in accordance with the rotational position of arm 80 obtained with respect to bearing 82 in response to the steering force applied by axle 28 via link 84.

To provide bias force control, an over-center linkage 85 is supported by and operates with respect to bearing 82. Spring 40 is supported at its inner end by and is movable with respect to a swivel mount 87 upstanding from axle 15. The outer end of spring 40 is attached to linkage 85, as shown. Linkage 85 positions spring 40 with respect to the pivot point of arm 80 at bearing 82 so as to exert bi-directional rotational effort on arm 80. This effort is transmitted via link 84 and axle 28 to the guide wheels 29 and 30 in alternate sequence as a left bias force and right bias force. A bi-directional reciprocative operator 86 controls the position of and is connected to linkage 85 at the location at which it receives the spring force from spring 40. Operator 86 serves to position linkage 85 to receive the spring force at two over-center positions corresponding to a right bias position (FIG. 5) and a left bias position (FIG. 6) for right and left bias mode operation, respectively. Preferably, operator 86 is constituted by a double acting reciprocative hydraulic actuator, although other types of actuators may be used if desired. To adjust transverse movement or throw of the guide axle, or the locations of the guide wheels at their respective bias positions, link 84 may be contractable or extendable to adjust the position of the forward end of arm 80 with respect to the guide axle 28.

Figure 8:
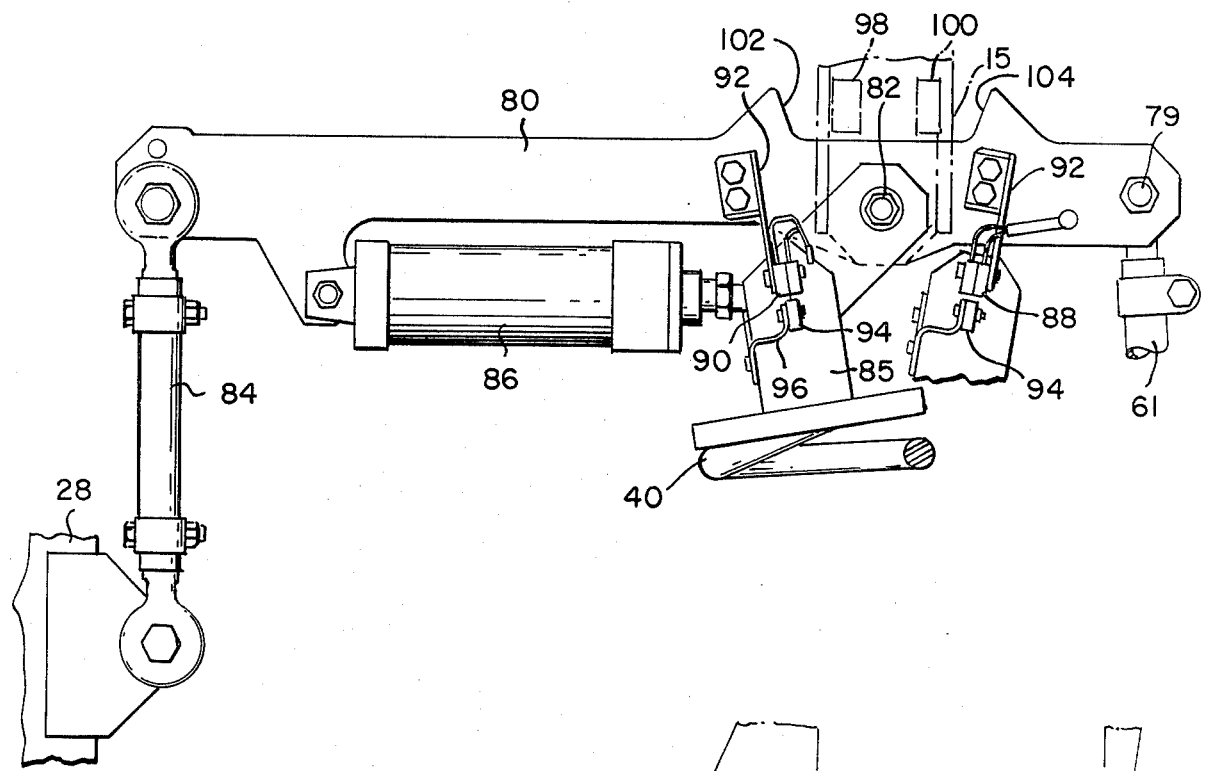
FIG. 8 is a top plan view of the biasing mechanism of the FIG. 1 apparatus on enlarged scale with parts broken away.

Referring to FIG. 8, two spaced apart position sensors 88, 90 are supported by brackets 92 upstanding from the steering arm on opposite sides of bearing 82 and sense the presence of an activating element 94 supported by bracket 96 upstanding from linkage 85. Sensors 88 and 90 are operated in response to linkage 85 assuming its right and left bias postions, respectively. Preferably, sensors 88 and 90 are magnetic reed switches and element 94 is a magnet. Still referring to FIG. 8, spaced apart over-travel stops 98 and 100 upstanding from axle 15 may be provided to engage opposed shoulders 102 and 104, respectively, formed by arm 80, thereby preventing rotation of arm 80 beyond its right and left bias positions.

As will now be appreciated, since the steering apparatus operates with respect to the guide surfaces in alternate sequence, only one guide surface is needed to provide directional guidance to the vehicle as it moves along the travel path. Thus, it is possible, by switching the steering assembly from one follower mode to the other at appropriate locations, to obtain continuous directional guidance as the vehicle progresses along the travel path, even though only one guide surface is available along all or portions of the travel path. Such switching may be provided by a sensor responsive to proximity with a stationary trigger element embedded in the roadbed or guideway, for example, so as to cause operator 86 to reposition linkage 85 at the opposite over-center position at a desired location, depending upon whether a guide surface is available adjacent the right or left side of the vehicle.

Referring now to FIGS. 10 and 11 of the drawings, a modified version of the steering apparatus according to this invention is illustrated, wherein parts corresponding to parts already described with reference to FIGS. 1-8 are designated with the reference numerals, primed. The FIG. 10 apparatus is generally similar to the FIG. 1 apparatus, except that the right front steering arm 20' is connected directly to the guide axle by swivel joint 106; arm 80' is connected to the guide axle by swivel joint 108 and additionally is connected directly to the left front steering arm 19'; and the position of the bias force control mechanism is reversed with respect to the FIG. 1 mechanism. In the illustrated example of FIG. 10, therefore, the mechanism 42' is illustrated in its left bias position. Since the control arm 80' and steering arm 20' are connected to axle 28' at their front ends, the FIG. 1 link 84 is eliminated, as are the FIG. 1 support rods 48, 50, 52 and 54, and tie rods 61 and 62. In the FIG. 10 apparatus, therefore, wheels 23' and 24' are steered simultaneously responsive to movement of arms 20' and 80'. However, like the FIG. 1 control arm 80, the FIG. 10 control arm 80' transmits biasing forces to the guide axle via rigid connections.

Although two embodiments of the present invention have been illustrated and described herein, variations will become apparent to one of ordinary skill in the art. For example, although the guide axle is located at the front end of the vehicle, it could be located at other positions. Accordingly, the invention is not to be limited to the specific embodiments illustrated and described herein and the true scope and spirit of the invention are to be determined by reference to the appended claims.

The embodiments of the invention in which an exclusive property or privilege is claimed are defined as follows:

1. Steering apparatus for a vehicle adapted to travel along a predetermined travel path bordered by at least one available guide surface providing directional guidance to the vehicle, the vehicle including at least one steerable wheel, the steering apparatus comprising: guide follower means including two rotatable guide wheels located adjacent opposite sides of the vehicle for respectively contacting available guide surfaces to co-operatively follow the contour thereof; and steering means operatively connected to said guide follower means for maintaining a selected one of said guide wheels in contact with the cooperative guide surface and turning the steerable wheel to control the direction of travel of the vehicle along the path in response to the position of the selected one guide wheel as it follows the contour of the cooperative guide surface; said steering means including bi-directional biasing means for applying opposite biasing forces to said guide wheels to maintain contact with the cooperative guide surfaces, said biasing means including a single source of biasing force providing a predetermined biasing force and biasing force control means operatively associated with said source for continously transmitting said biasing force to said guide wheels in alternate sequence, whereby said guide wheels may be biased without counteracting said source to control the biasing force applied.

2. The apparatus of claim 1, wherein said source consists of movable spring means, and said biasing force control means include rotatable control arm means acting between said guide follower means and the steerable wheel, and means for selectively positioning said spring means to apply bi-directional rotational effort to said control arm for providing said biasing forces.

3. The apparatus of claim 2, wherein said positioning means include an over-center linkage subject to an over-center bias exerted by said spring means and operatively connected to said control arm means to be positionable at a left bias position and a right bias position in which the over-center bias exerted by said spring means with respect to a said control arm means applies said bi-directional rotational effort thereto, and operator means acting between said control arm means and said linkage for alternately positioning said linkage at its left bias position and its right bias position.

4. The apparatus of claims 2 or 3, wherein said control arm means include a control arm pivotally supported intermediate its ends and means rigidly connecting one end of said control arm to said guide follower means.

5. The apparatus of claim 4, wherein said means rigidly connecting one end of said control arm include adjustable link means for adjusting the position of said one end with respect to said guide follower means.

6. The apparatus of claim 5, wherein the steerable wheel is supported by a movable steering arm, and wherein said control arm means further include a tie rod connecting the other end of said control arm to the steering arm.

7. The apparatus of claim 6, wherein said guide follower means include a guide axle mounting said guide wheels at the ends thereof and connected to said link means intermediate the ends thereof, and tie rod means supporting said guide axle independently of the steering arm in generally transverse alignment with the path adjacent one end of the vehicle.

8. The apparatus of claim 4, wherein said means rigidly connecting one end of said control arm include a swivel joint.

9. The apparatus of claim 8, wherein the steerable wheel is supported by a movable steering arm, and wherein said control arm is connected directly to the steering arm.

10. The apparatus of claim 9, wherein the vehicle includes a second steerable wheel supported adjacent the first-mentioned steerable wheel by a second movable steering arm, and wherein said guide follower means include a guide axle mounting said guide wheels at the ends thereof and mounting said swivel joint intermediate the ends thereof, said guide axle being supported by said control arm and the second steering arm in generally transverse alignment with the path adjacent one end of the vehicle.

11. The apparatus of claim 1, wherein the vehicle includes two front steerable wheels, and wherein said steering means include means acting between said biasing means and one front steerable wheel for steering said one front steerable wheel, and means acting between said one front steerable wheel and the other front steerable wheel for steering said other front steerable wheel in unison with said one front steerable wheel.

12. The apparatus of claim 1, wherein the vehicle includes two front steerable wheels, and wherein said biasing means are connected directly to one front steerable wheel for steering said one front steerable wheel, and wherein said steering means include means acting between said guide follower means and the other front steerable wheel for steering said other front steerable wheel in unison with said one front steerable wheel.

13. The apparatus of claims 11 or 12, wherein the vehicle further includes two rear steerable wheels, and wherein said steering means further include means acting between said one front steerable wheel and one rear steerable wheel for steering said one rear steerable wheel in unison with said one front steerable wheel, and means acting between said one rear steerable wheel and the other rear steerable wheel for steering said other rear steerable wheel in unison with said one rear steerable wheel.

* * * * *